(12) United States Patent
Spangenberg

(10) Patent No.: US 6,393,931 B1
(45) Date of Patent: May 28, 2002

(54) DECLUTHABLE MANUAL OVERRIDE GEARBOX

(75) Inventor: Ronald S Spangenberg, Chardon, OH (US)

(73) Assignee: Kinetrol Limited, Farnham (GB)

(*) Notice: Subject to any disclaimer, the term of this patent is extended or adjusted under 35 U.S.C. 154(b) by 0 days.

(21) Appl. No.: 09/571,287

(22) Filed: May 16, 2000

(51) Int. Cl.[7] ................ F16H 1/16; F16H 1/20
(52) U.S. Cl. ............... 74/425; 74/396; 74/405; 251/249.5
(58) Field of Search .................. 192/71, 93 R, 192/20; 74/425, 396, 395, 405, 406; 251/248, 249, 249.5

(56) References Cited

U.S. PATENT DOCUMENTS 4,533,114 A * 8/1985 Cory et al. ............... 251/67
4,616,803 A * 10/1986 Schils ..................... 251/14

* cited by examiner

Primary Examiner—David Fenstermacher
(74) Attorney, Agent, or Firm—Jones, Tullar & Cooper, PC

(57) ABSTRACT

A declutchable manual override gearbox, comprising a casing, and a drive shaft mounted for rotation within the casing. The drive shaft has an input end and an output end, the input end of the drive shaft adapted to engage the output of a rotary actuator and the output end of the drive shaft adapted for attachment to a device or mechanism, for example the drive linkage for a damper valve, to be driven by the actuator. A manual override is provided for manually rotating the drive shaft, the gearbox also including a clutch arrangment for selectively rendering the manual override inoperative. Attachments associated with a base portion of the casing enable mounting of the gearbox on an underlying support stand.

20 Claims, 3 Drawing Sheets

DECLUTHABLE MANUAL OVERRIDE GEARBOX

FIELD OF THE INVENTION

This invention relates to a declutchable manual override gearbox, in particular such a gearbox for use with rotary actuators, for example pneumatic rotary actuators.

BACKGROUND OF THE INVENTION

Rotary actuators are used in a great variety of applications. There are many designs of rotary actuator, including examples actuated by hydraulic pressure, pneumatic pressure and electric drives. It is also known to use position controllers to modulate the position of the actuator. All of these various designs have in common the purpose of providing an output torque which can be utilised to drive another device or mechanism.

By way of example, one common application for bi-directional rotary actuators is the positioning of large damper valves controlling the flow of air and other gases along ducting in power generating plants. These dampers are often inaccessible, so it is not possible to install drives immediately adjacent the valve. In such circumstances, the rotary actuator drives the damper valve via a mechanical linkage. The rotary actuator will, in most cases, be used in conjunction with a position controller to provide for accurate control of the position of the damper valve.

In this, and other applications of rotary actuators, it can sometimes be desirable to provide for manual adjustment of the position of the actuator, for example during the initial set-up of a mechanism, or on failure of automatic actuator function. This is generally accomplished by using a so called declutchable manual override gearbox. The gearbox is mounted adjacent to the actuator and is connected to the output of the actuator. Drive is transferred via the gearbox to a drive shaft connected to the gearbox output. The gearbox includes a manually operable override, typically a wheel or lever, selectively engageable with the drive train in the gearbox. In normal operation, this manual override is de-clutched from the drive train. However, if it is desired to manually adjust the position of the actuator and the mechanism it drives, the manual override can be engaged.

FIG. 1 illustrates a prior art drive for a damper valve. The damper valve (not shown) is driven through a push rod (also not shown), which is in turn driven by a lever 102. The lever is mounted on the end of a heavy duty drive shaft 104, the otherend of this drive shaft being drivably connected to the output of a declutchable manual override gearbox 106. The drive shaft 104 is driven via the gearbox by a bidirectional pneumatic rotary actuator 108, the position of which between end limiting positions is modulated by a position controller 110. The drive shaft 104 is supported at its end adjacent to the lever 102 by a support bearing 112 mounted on a carrier bracket 114. The carrier bracket is itself supported on a floor mounted stand 116, to which it is welded. The carrier bracket 114 is also provided with mounting points to which the gearbox 106 is mounted to be suspended cantilever-like from the carrier bracket 114. The weight of the pneumatic actuator and its position controller is also borne by the gearbox mounting points of the side of the carrier bracket 114.

Conveniently, such an arrangement can be assembled by selecting and fitting together a standard, "off-the-shelf" actuator, position controller and gearbox. However, it is necessary to use a custom-made carrier bracket and floor mounted stand. The drive shaft also has to be custom-made and an appropriate support bearing selected and mounted on the carrier bracket. Often these custom made parts are unique to one particular installation and consequently contribute a substantial proportion of the total cost of the equipment.

SUMMARY OF THE INVENTION

It is an object of the present invention to provide a declutchable manual override gearbox, preferably suitable for use with a rotary actuator (although not necessarily exclusively for such use), for example a pneumatic rotary actuator, which facilitates a more compact drive arrangement through which the actuator can drive other devices or mechanisms.

It is another object of the present invention to provide such a gearbox that minimises the need for custom-made parts in the drive arrangement.

In one aspect, the present invention provides a declutchable manual override gearbox, comprising a casing, and a drive shaft mounted for rotation within the casing. The drive shaft has an input end and an output end, the input end of the drive shaft adapted to engage the output of a rotary actuator (or other drive means) and the output end of the drive shaft adapted for attachment to an element to be driven by the actuator or gearbox. Manual override means are provided for manually rotating the drive shaft, the gearbox also including means for selectively rendering the manual override means inoperative. Means associated with a base portion of the casing enable mounting of the gearbox on an underlying support stand.

In another aspect, the invention provides a drive arrangement for a device or mechanism, comprising a rotary actuator, a declutchable manual override gearbox as defined above, and a support stand below the gearbox on which the gearbox is supported.

The above and other objects will be exemplified in the following description of specific embodiments of the invention.

DETAILED DESCRIPTION OF THE EMBODIMENT

Figure 2:
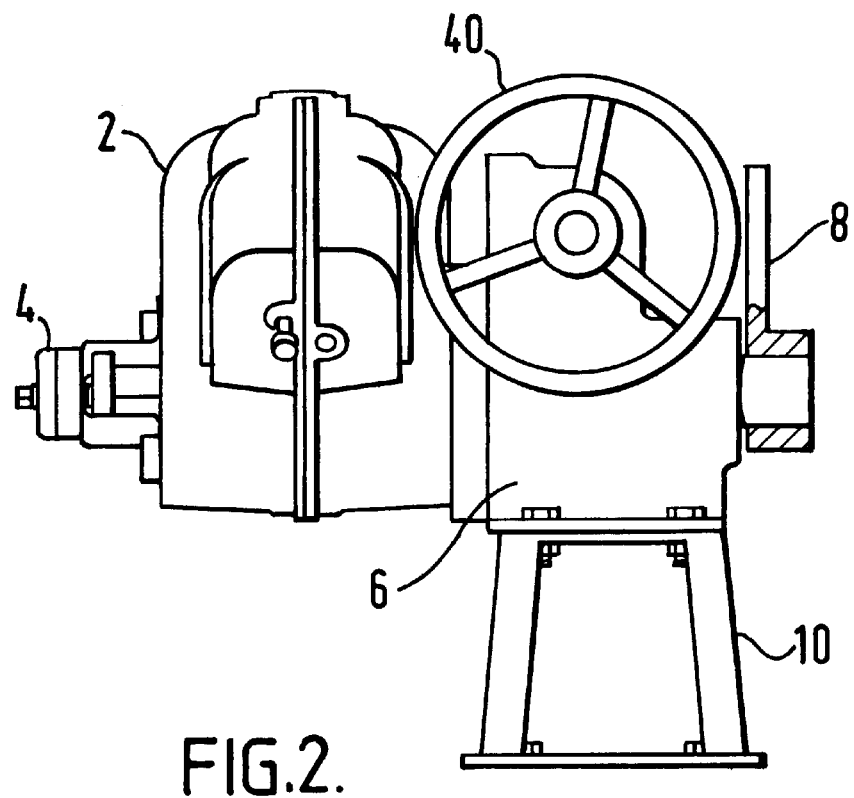
FIG. 2 is a similar side elevation on the same scale of another drive arrangement for a damper valve, including a declutchable manual override gearbox according to an embodiment of the present invention.

Referring to FIG. 2, a drive arrangement for a damper valve (not shown) comprises a rotary actuator 2, the position of which is modulated by a position controller 4. The rotary actuator 2 drives the damper valve through a declutchable manual override gearbox 6, described in greater detail below. Attached directly to an output of the gearbox 6 is a lever 8, which is itself connected to a push rod (not shown) that provides the link to the damper valve. The gearbox sits on a floor mounted stand 10.

In this example, the rotary actuator 2 is a pneumatic actuator of the type available from Kinetrol Limited, Surrey, UK. The actuator 2 is bi-directional and is limited to reciprocate between opposite end positions, giving a total rotary stroke of approximately 90 degrees. Compressed air can be supplied in a controlled manner to opposite sides of the actuator to drive it between these end positions.

The precise position of the actuator 2 between its two extreme end positions is controlled by position controller 4. This controller operates in a known manner to modulate the supply of compressed air to the opposite sides of the actuator, to move it to, and hold it in any desired position. One example of such a position controller is the Kinetrol HP pneumatic positioner.

Figure 3:
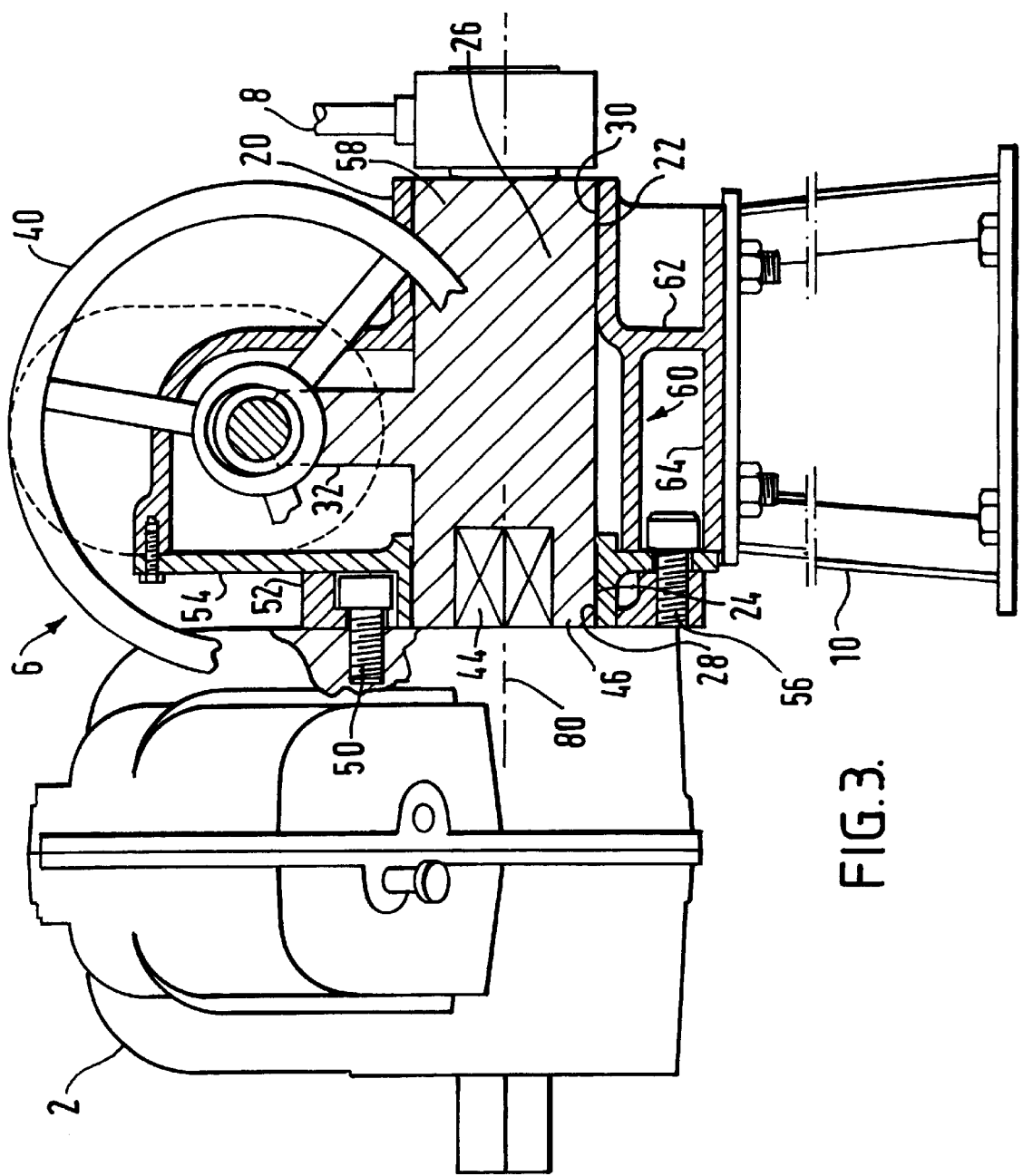
FIG. 3 is a part-sectioned side elevation of the drive arrangement of FIG. 2, on an enlarged scale.
Figure 4:
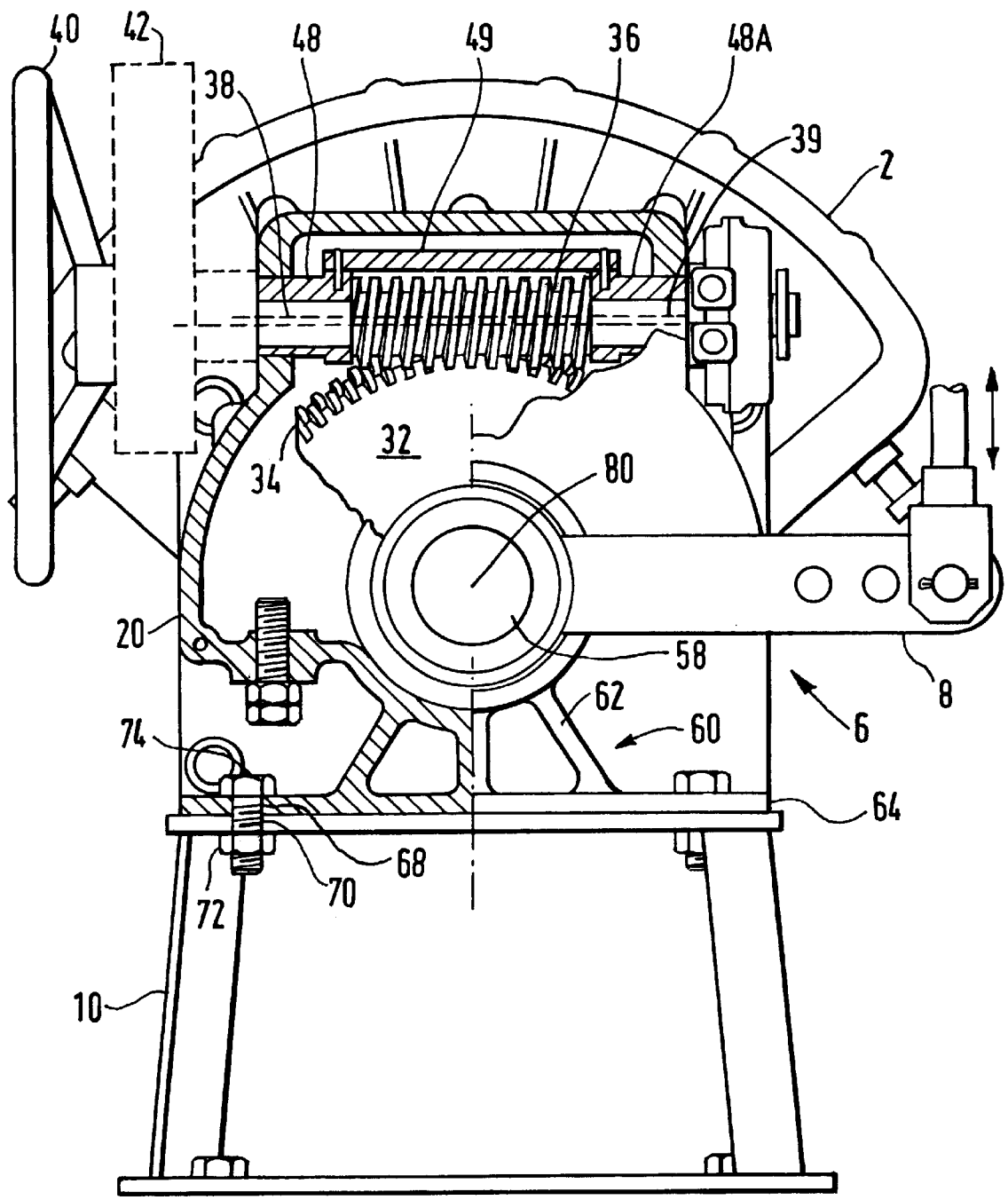
FIG. 4 is a part-sectioned end elevation of the arrangement of FIG. 3, also on an enlarged scale.

Turning to FIGS. 3 and 4, the construction and operation of the declutchable manual override gearbox 6 will be described in more detail.

The main structure of the gearbox 6 is provided by a casing 20. The casing 20 defines main journals 22,24 at opposite ends of the gearbox, in which a drive shaft 26 is rotatably journalled to extend the length of the gearbox 6. The drive shaft is supported on bearings 28,30 within respective journals 22,24.

Figure 1:
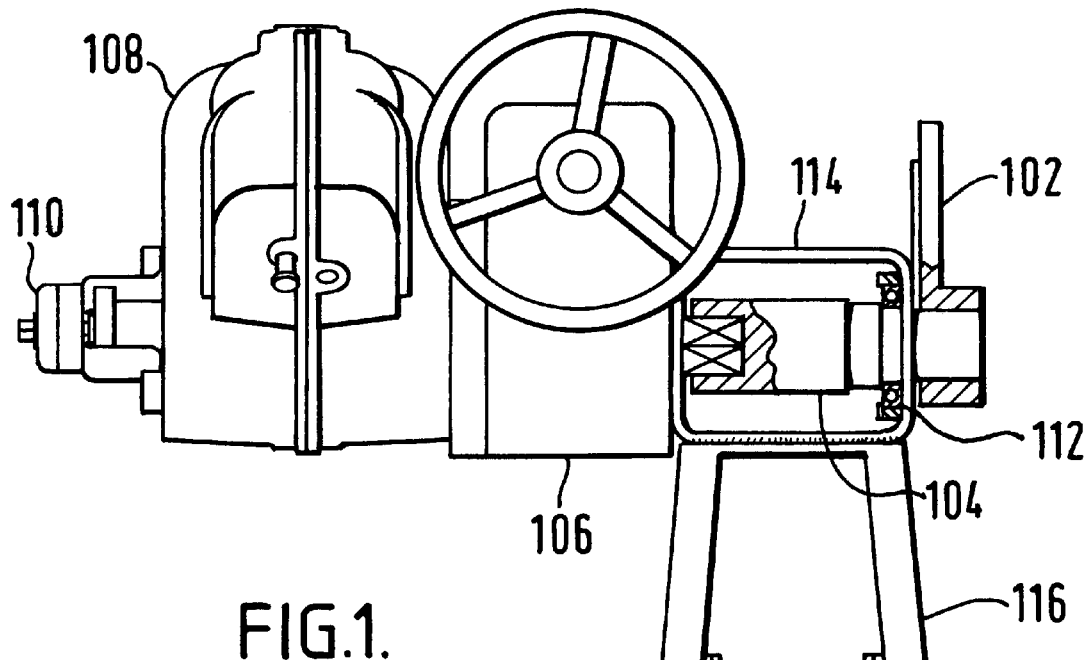
FIG. 1 is a side elevation of a prior art drive arrangement for a damper valve.

In stark contrast to the gearbox conventionally used in the arrangement illustrated in FIG. 1, in the gearbox of this embodiment at least the bearing 30 supporting the drive shaft 26 at the output side of the gearbox 6 is selected to carry heavy side loads, such as those that would be exerted on it in use by the lever 8. The prior art gearbox, on the other hand, does not employ bearings at all, the gearbox shaft simply being journalled in the gearbox casing itself. Notably, the drive shaft 26 used in the gearbox 6 of the embodiment is significantly larger in diameter that the shaft used in the conventional gearbox, allowing the use of bearings which are large enough to withstand the expected side loads whilst still having a long lifetime in service.

Formed integrally with the drive shaft 26, extending perpendicularly upwardly from a central portion thereof, is a worm wheel segment 32. The plane of the worm wheel 32 extends perpendicularly to the longitudinal axis of the drive shaft 26, and the arc of the worm wheel is centered on the axis of the shaft 26. The arcuate extent of the worm wheel 32 corresponds to the rotary stroke of the actuator 2 and a series of teeth 34 are formed along the circumferential edge of the worm wheel in a conventional manner.

A worm 36 is engaged with the teeth 34 of the worm wheel 32. The worm itself extends across the width of the gearbox 6, its longitudinal axis extending perpendicularly to that of the drive shaft 26, and is rotatably journalled in bearings to opposite sides of the casing 20.

Reduced diameter end portions 38,39 of the worm 36 protrude from the casing 20 at either side. Mounted to one end portion 38 is a manual override wheel 40, which can be turned by hand. If desired, the manual override wheel 40 can be connected to the worm 36 through a reduction gearbox 42 to reduce the effort required by a person to turn the manual override wheel 40 when, as described below, it is used to adjust the position of the actuator 2 and hence the damper valve to which it is linked.

The protruding end portions 38,39 of the worm 36 are eccentrically mounted in respective collars 44,45, which are themselves itself mounted for rotation on the casing 20. By rotating the eccentric collars 44,45, the axis of the worm 36 can be lifted upwardly away from the worm wheel 32, disengaging (i.e. declutching) the worm 36 from the teeth 34 of the worm wheel 32. Returning the collar to its original position, by rotating it in the opposite direction, re-engages the worm 36 and worm wheel 32 once more.

The actuator 2 is mounted on one end of the gearbox 6, an output 44 of the actuator 2 engaging one end 46 of the drive shaft 26. Specifically, as best seen in FIG. 3, the actuator 2 is secured, in this example by bolts 50, to a mounting plate 52. This plate 52 is in turn secured to an end wall 54 of the gearbox casing 20 by a further set of bolts 56. Alternative releasable attachment means may of course be used in place of the bolts 50,56 if desired. A further possibility would be to permanently secure the actuator 2 to the mounting plate 52, for example by welding, although this is not preferred.

Using a mounting plate 52 in the manner described above provides a particularly convenient way of assembling and disassembling the actuator 2 with the gearbox, for example for maintenance purposes. The opposite end 58 of the drive shaft 26 is adapted for attachment of the lever 8, to confine the lever 8 to rotate with the drive shaft 26. For example the lever 8 may be splined to the end 58 of the drive shaft, or alternatively a feather key-type attachment may be used. Many other examples of attachment will be readily apparent to the skilled person. Of course, other devices, elements or mechanisms may be attached to the end of the drive shaft 26 in alternative applications of the gearbox of the invention.

At the base 60 of the gearbox casing 20, webs 62, integrally formed with the casing 20, extend downwardly to a base plate 64. This base plate 64 is also formed integrally with the casing 20. The plate 64 is provided with means, in this example bolt holes 68 by which it can be secured to the floor mounted stand 10 it sits on. Specifically, corresponding holes 70 are formed in the stand 10, nuts 72 and bolts 74 being used to secure the gearbox base plate 64 to the stand. Other forms of securing means may, of course, be used in place of the bolts 74, such as clamps, welds or the like.

In the exemplary arrangement described, by virtue of unique design of the declutchable manual override gearbox, the only custom part that it is necessary to manufacture for any particular application is the floor mounted stand 10. The new gearbox does away with the need for the custom carrier bracket and drive shaft of the prior art arrangement illustrated in FIG. 1, as well as the need to mount a load supporting bearing in the carrier bracket. The new design also eliminates one or more rotary coupling interfaces, necessary between the in-line components of the conventional arrangement, and which in the conventional arrangement are a potential source of undesirable backlash between the drive actuator and the driven load.

It will be appreciated that the invention is not limited to the details of the specifically described embodiment, and many modifications may be made without departing from the scope and spirit of the claimed invention. For instance, whilst the example describes a drive arrangement for a damper valve, the declutchable manual override gearbox of the invention can be used in many other applications where it is desired to use a rotary actuator to drive a device or mechanism.

What is claimed is:

1. A declutchable manual override gearbox, comprising:
   a casing, said casing including a generally planar casing base;
   a drive shaft mounted for rotation within said casing, said drive shaft having an input end, an output end, and an axis of rotation, said input end of said drive shaft adapted to engage an output of a rotary actuator and said output end of said drive shaft adapted for attachment to a device or mechanism to be driven by the actuator;

manual override means for manually rotating said drive shaft;

means for selectively rendering said manual override means inoperative; and means associated with said generally planar casing base for mounting said gearbox on an underlying support stand with said generally planar casing base being parallel to said axis of rotation of said drive shaft.

2. A manual override gearbox according to claim 1, wherein said drive shaft has associated therewith a worm wheel, said manual override means comprising a worm engageable with said worm wheel, said worm being manually rotatable to effect rotation of said drive shaft.

3. A manual override gearbox according to claim 2, wherein said worm wheel is integral with said drive shaft.

4. A manual override gearbox according to claim 1, wherein said means for mounting said gearbox on an underlying support stand comprise releasable attachments.

5. A manual override gearbox according to claim 4, wherein said releasable attachments comprise a nut and bolt.

6. A manual override gearbox according to claim 1, wherein said generally planar casing base comprises a base plate for mounting on an underlying support stand.

7. A manual override gearbox according to claim 6, wherein said means for mounting said gearbox on an underlying support stand comprise releasable attachments.

8. A manual override gearbox according to claim 7, wherein said releasable attachments comprise a nut and bolt.

9. A manual override gearbox according to claim 1, further including means for mounting a rotary actuator to said casing adjacent to said input end of said drive shaft.

10. A manual override gearbox according to claim 9, wherein said actuator mounting means comprises an actuator mounting plate mountable on said casing, said actuator mounting plate being adapted to allow mounting of the actuator thereto.

11. A drive arrangement for a device including a rotary actuator, a declutchable manual override gearbox for driving the rotary actuator, and a support stand on which said gearbox is supported, said gearbox comprising:

a casing said casing having a base portion;

a drive shaft mounted for rotation within said casing, said drive shaft having an input end, an output end, and an axis of rotation, said input end of said drive shaft engaging an output of the rotary actuator and said output end of said drive shaft adapted for attachment to the device to be driven by the rotary actuator;

manual override means for manually rotating the drive shaft;

means for selectively rendering the manual override means inoperative; and means associated with said base portion of said casing for mounting said gearbox on the support stand, said base portion being generally planar and parallel to said axis of rotation of said drive shaft.

12. A drive arrangement according to claim 11, wherein said drive shaft has associated therewith a worm wheel, said manual override means comprising a worm engageable with said worm wheel, said worm being manually rotatable to effect rotation of said drive shaft.

13. A drive arrangement according to claim 12, wherein said worm wheel is integral with said drive shaft.

14. A drive arrangement according to claim 11, wherein said means for mounting said gearbox on a support stand comprises releasable attachments.

15. A drive arrangement according to claim 14, wherein said releasable attachments comprise a nut and bolt.

16. A drive arrangement according to claim 11, wherein said base of said casing includes a base plate for mounting on a support stand.

17. A drive arrangement according to claim 16, wherein said means for mounting said gearbox on a support stand comprises releasable attachments.

18. A drive arrangement according to claim 17, wherein said releasable attachments comprise a nut and bolt.

19. A drive arrangement according to claim 11, comprising means for mounting the rotary actuator to said casing adjacent to said input end of said drive shaft.

20. A drive arrangement according to claim 19, wherein said actuator mounting means comprises an actuator mounting plate mountable on said casing, said actuator mounting plate being adapted to allow mounting of the actuator thereto.

* * * * *